G. W. DAGUE.
VEHICLE WHEEL.
APPLICATION FILED FEB. 24, 1919.
1,335,939.
Patented Apr. 6, 1920.
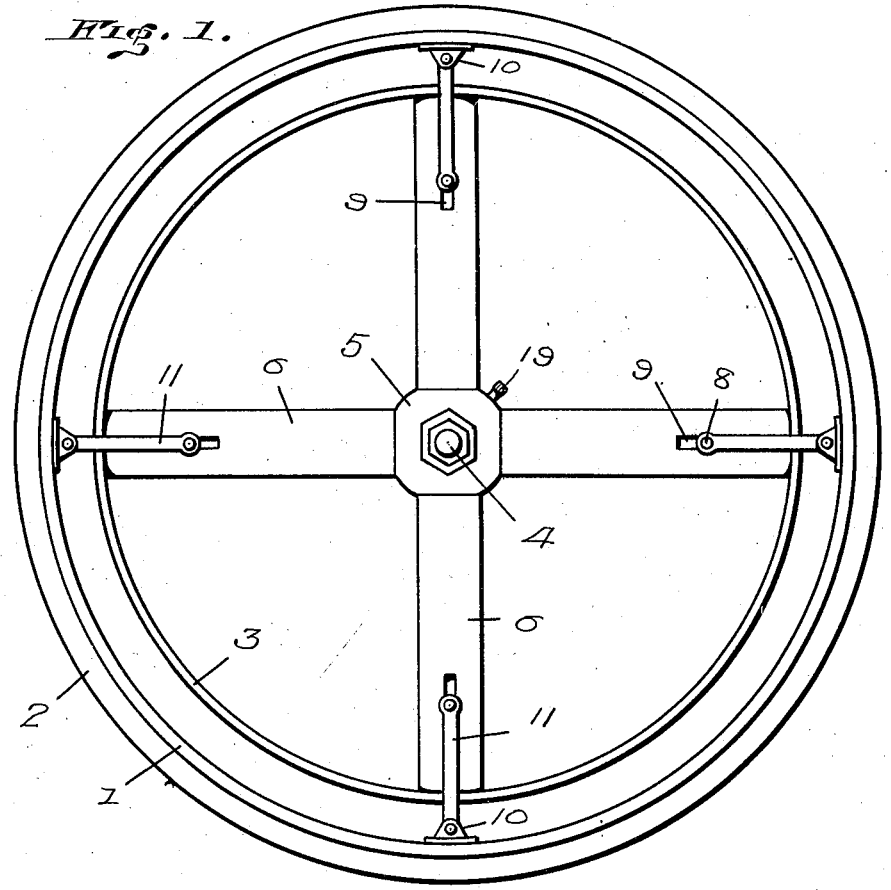
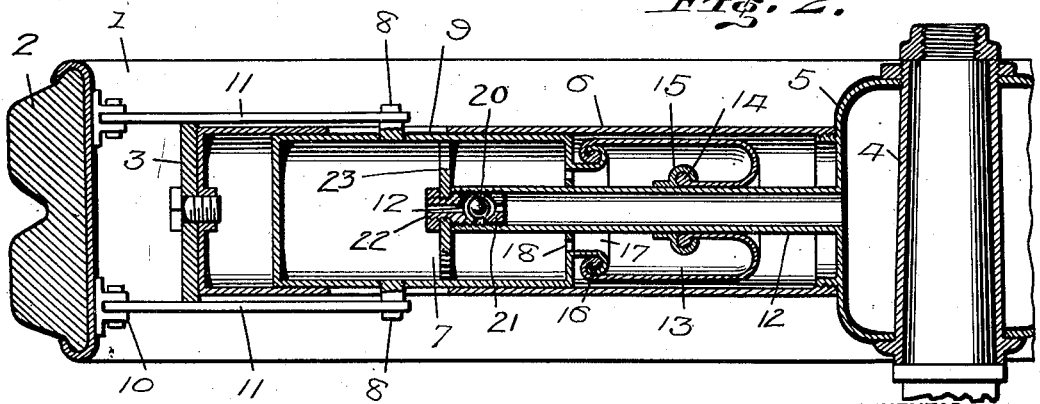
WITNESS:
Thos. W. Riley
INVENTOR.
George W. Dague
BY
W. J. Fitz Gerald & Co.
ATTORNEYS.

UNITED STATES PATENT OFFICE.

GEORGE W. DAGUE, OF ALEXANDRIA, LOUISIANA.

VEHICLE-WHEEL.

1,335,939.   Specification of Letters Patent.   Patented Apr. 6, 1920.

Application filed February 24, 1919. Serial No. 278,847.

*To all whom it may concern:*

Be it known that I, GEORGE W. DAGUE, a citizen of the United States, residing at Alexandria, in the parish of Rapides and State of Louisiana, have invented certain new and useful Improvements in Vehicle-Wheels; and I do hereby declare the following to be a full, clear, and exact description of the invention, such as will enable others skilled in the art to which it appertains to make and use the same.

The present invention relates to vehicle wheels, and aims to provide a wheel, which instead of using a pneumatic tire employs pneumatic means of novel and improved construction within the wheel proper to accomplish the cushioning or resilient action, without the objections incident to pneumatic tires which wear out and become punctured easily, whereas the present construction will have a long life.

A further object of the invention is the provision of a vehicle wheel having spoke constructions of novel form to provide for the yielding motion between the rim and hub, using air cushions for that purpose.

A still further object is the provision of such a wheel comprising a novel assemblage of the component elements, in order that the wheel will be practical and efficient in operation.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of the improved wheel.

Fig. 2 is a radial section through one spoke.

The wheel includes a suitable rim 1 on which a tire 2 of solid rubber or other material is fitted, and said rim surrounds and is spaced from a felly or band 3. The hub 4 is provided thereon with a chamber 5 to which are attached in any suitable manner the inner ends of tubular spokes 6 which have their outer ends suitably secured to the felly or band 3, thus providing the wheel proper. Any suitable number of spokes can be used, although four are shown.

Slidable longitudinally within each spoke 6 is a hollow plunger 7, to which are attached opposite outstanding pins or studs 8 which project through and work within opposite longitudinal slots 9 in the corresponding spoke 6. The plunger 7 closes the slots 9, to prevent the escape of air therethrough, and to also exclude dust and foreign matter from the interior spokes. Links 11 are pivotally connected at their inner ends to the studs 8, and at their outer ends to pieces 10 secured to the inner periphery of the rim 1, said links 11 being arranged in pairs and extending slidably across the opposite edges of the felly or band 3, thus maintaining the felly and rim in a common plane, and permitting them to move relatively in said plane. Said links serve as guide bars for the felly 3 in its movement toward and away from the rim, and said links permit of slight relative angular movement of the rim and felly.

The relative motion of the rim and felly result in the sliding movement of the plungers 7 within the spokes 6, and air cushions are provided within said spokes to resist the displacement of the rim and felly, and to absorb shocks. Radial tubes 12 are secured to the chamber 5 and project outwardly axially within the spokes 6, and the inner ends of the plungers 7 are slidable on said tubes 12. Diaphragms 13 of rubber or other elastic material are arranged within the spokes 6 beyond the inner ends of the plungers 7, and are attached to said plungers and tubes. Thus, the outer edge of each diaphragm 13 has a bead 16 secured within an annular seat 17 with which the plunger 7 is provided, and the inner edge of the diaphragm has a similar bead 14 fitted within a seat 15 secured on the tube 12 beyond the inner end of the plunger. The inner end of the plunger has openings 18 within the seat 17, permitting the flow of air into and out of the chamber within the diaphragm.

The hub chamber 5 has a nipple 19, similar to the valve stem of a pneumatic tire, for the purpose of pumping in air, to inflate the diaphragms 15. Thus, by pumping air into the chamber 5, the air passes outwardly through the tube 12 into the plungers 7 and thence through the openings 18 into the diaphragm chambers. In this way, the desired air pressure can be maintained within the air cushions of the spokes, similar to the inflation of pneumatic tire. This provides for the cushioning action of the wheel, similar to pneumatic tire wheel, it being noted that when the rim and felly move toward one another at the bottom of the wheel, the links 11 move the plunger 7 inwardly within the respective spoke 6, and the inner edge of the diaphragm is therefore moved toward the outer edge, whereby to have a tendency to reduce the column of the diaphragm chamber. This will bring the air under greater compression, to resist and cushion the motion between the rim and felly, and it will be noted that the diaphragm 13 can stretch in addition to the yielding action of the air. This affords an air cushion that will provide for easy riding. The tendency for the air to expand in each of the spokes will hold the rim and felly concentric when relieved of strains, and it will also be noted that the air is confined within the outer and inner end portions of the spokes to provide air cushions.

It is preferable to provide check valves 20 for the tubes 12, and, as shown, the valves 20 are in the form of balls. Thus, a ball valve 20 is disposed loosely within the outer end portion of each tube 12, and an apertured seat 21 is secured within the tube for said valve to seat against inwardly thus permitting the flow of air outwardly through said tube, but preventing the inward flow, thereby confining the air in the plunger 7. In this connection it is also desirable to secure a piston 23 to the end of the tube 12 to work within the plunger 7, so that the air will be compressed between the piston 23 and outer end of the plunger, and it will be noted that the outward movement of the plunger will compress the air within the diaphragm 13. This piston 23 is secured in place by an apertured member 22 secured within the end of the tube 12.

Having thus described the invention, what is claimed as new is:—

1. A vehicle wheel embodying a hub having an air chamber, tubes extending from the hub in communication with said chamber, hollow plungers slidable over said tubes, a rim connected to said plungers, means between said tubes and plungers forming air chambers communicating with said tubes, and check valves in said tubes for preventing the flow of air back into the first named chamber.

2. A vehicle wheel embodying a hub, tubular spokes carried by the hub, a rim, hollow plungers connected to the rim and slidably fitting said spokes, members extending from the hub within said plungers, and diaphragms within the spokes connected to said plungers and members and forming air cushions.

3. A vehicle wheel comprising a hub having an air chamber, tubular spokes carried by the hub, a rim, hollow plungers slidable in the spokes and connected to the rim, tubes extending from said hub in communication with the chamber into said plungers, pistons on the outer ends of the tubes fitting within said plungers, said tubes establishing communication between said chamber and the chambers of the plungers between the outer ends thereof and pistons, check valves for said tubes to prevent the inward flow of air therein, and diaphragms connected to said tubes and plungers inwardly of said pistons.

4. A vehicle wheel embodying a hub having an air chamber, tubular spokes carried by the hub, a rim, hollow plungers slidable in the spokes and connected to the rim, tubes extending from said chamber into said plungers, and diaphragms connected to said tubes and plungers and providing air cushions communicating with said plungers and tubes.

In testimony whereof I have signed my name to this specification in the presence of two subscribing witnesses.

GEORGE W. DAGUE.

Witnesses:
R. C. CULPEPPER,
C. S. PROSSER.